United States Patent [19]

Peytavin

[11] 4,019,394
[45] Apr. 26, 1977

[54] DRIVE DEVICE FOR CLAMP HOLDER CARRIAGES OF A CONTINUOUSLY OPERATING PILGER MILL

[75] Inventor: Pierre Peytavin, Neuilly-sur-Seine, France

[73] Assignee: Vallourec, Paris, France

[22] Filed: May 20, 1974

[21] Appl. No.: 471,833

[30] Foreign Application Priority Data

May 24, 1973 France .................. 73.18908

[52] U.S. Cl. .................................. 74/27
[51] Int. Cl.² ............................. F16H 21/02
[58] Field of Search ............ 74/27, 89.15, 22, 23, 74/424.8 R

[56] References Cited

UNITED STATES PATENTS

| | | | |
|---|---|---|---|
| 2,957,368 | 10/1960 | Hendrickson | 74/27 |
| 2,983,159 | 5/1961 | Zeligowsky et al. | 74/89.15 |
| 3,285,079 | 11/1966 | Homanick | 74/27 |
| 3,493,233 | 2/1970 | Foufounis | 74/89.15 |
| 3,572,140 | 3/1971 | Gulick | 74/89.15 |
| 3,802,281 | 4/1974 | Clarke | 74/89.15 |

*Primary Examiner*—Samuel Scott
*Assistant Examiner*—Wesley S. Ratliff, Jr.
*Attorney, Agent, or Firm*—Brisebois & Kruger

[57] ABSTRACT

A drive device for clamp holder carriages of a continuously operating pilger rolling mill, comprising two carriages sliding on slides parallel to the rolling axis. Each carriage is coupled to a screw threaded rod, rotation of which causes movement of the carriage, each rod being provided with an axially movable nut held from rotation. A push rod is supported on the nuts to move the nuts and the screws in the rolling direction, each of the screws being rotatable in driving directions towards and away from the rolling mill so as to permit the return of one clamp holder carriage while the other feeds stock to the mill.

7 Claims, 3 Drawing Figures

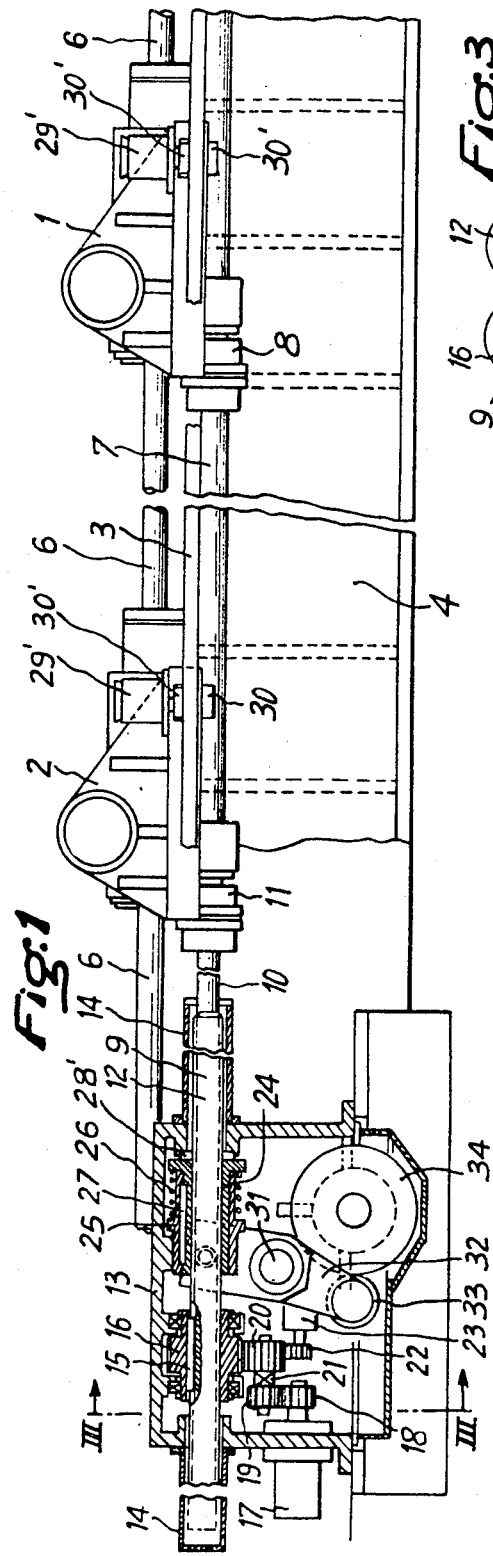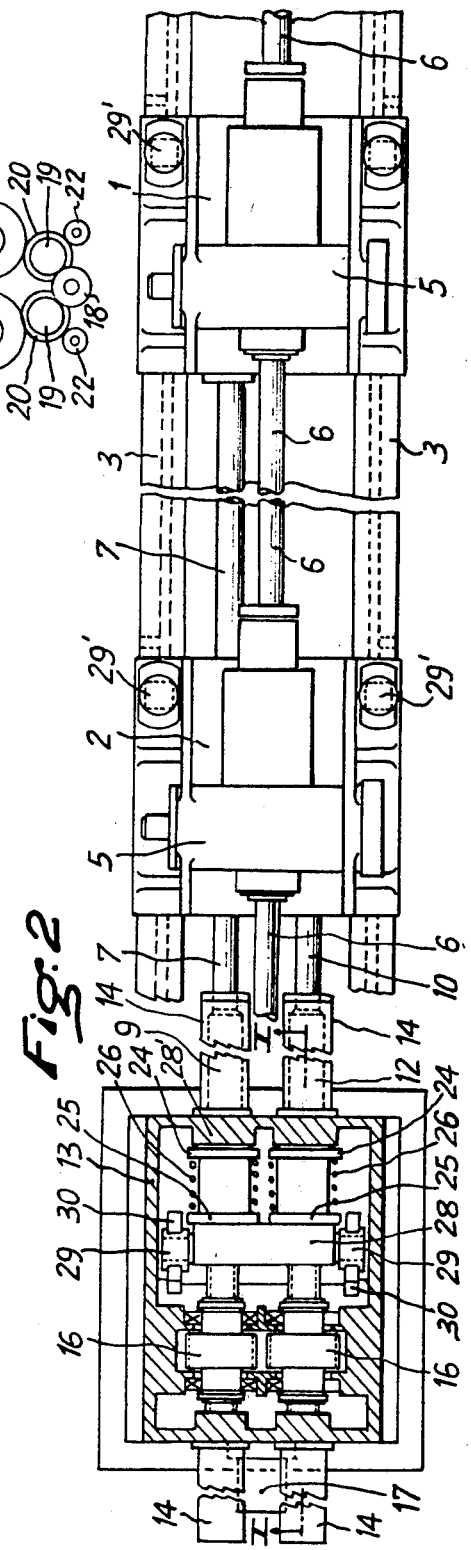

DRIVE DEVICE FOR CLAMP HOLDER CARRIAGES OF A CONTINUOUSLY OPERATING PILGER MILL

The present invention relates to a new drive device for clamp holder carriages for a continuously operating pilger rolling mill. It is known that pilger rolling mills have cages which are subject to a horizontal alternating movement and carry a pair of rollers which are simultaneously rotated during the alternating movements of the cage.

It is also known that the stock to be rolled is held between the rollers by clamps during rolling, whilst the clamps must move the stock by a given distance between rolling passes so as to engage a new length of the stock to be rollled for the next pass. Drive devices for the clamp holder carriages for pilger rolling mills are also known which comprise a screw whose one end is integral with the clamp holder, whereby the said screw can be rotated at a regulated speed, whilst a nut mounted on the screw, but which cannot rotate about the axis of the latter is periodically driven back by a device operated by a cam in such a way that successive axial displacements of the screw and consequently the clamp holder are obtained.

It is readily comprehensible that in this type of device the frequency of the displacements is determined by the frequency with which the nut mounted on the screw is driven back, whilst the length of each displacement is determined by the rotation speed imposed on the screw, whereby account is obviously taken of the pitch of the latter.

The present invention relates to a device of this type adapted so as to permit the control of two clamp holder carriages located one behind the other in the direction of movement of the stock to be rolled, whereby the latter is successively held by each of the clamp holders so as to ensure a continuous feed of the stock to be rolled.

The drive device according to the invention has the advantages of a simple and robust construction and of not subjecting the clamp holder carriage which is not in the working position to a jerky movement which leads to a reduction of the amount of energy used and prevents the premature wear of the equipment.

The object of the present invention is the new industrial product which comprises a new drive device for clamp holder carriages of a continuously operating pilger rolling mill, in which the device comprises two clamp holder carriages which can slide on slides parallel to the rolling axis under the action of screws, in which each carriage is axially integral with a screw which is rotated by a key device sliding in a longitudinal groove of the screw, in which each screw also has a nut which does not rotate with the screw but which can move axially relative to the latter, wherein periodically a push rod is supported on the said nuts to move the latter as well as the screws in the rolling direction in which each of the screws can be driven either in the rotation direction which leads to the movement of the clamp holder carriage in the rolling direction or in the opposite direction so as to permit the return of a clamp holder carriage whilst the other carriage ensures the holding and displacement of the stock which is being rolled.

According to a preferred embodiment of the invention the two screws are rotated from a common drive device which can be coupled to one or other or both the two members which leads to the rotation of each screw to ensure the movement of the clamp holder carriages in the roller direction.

In this preferred embodiment each screw can also be rotated in the opposite direction (when disengaged from the above-indicated common drive device) so as to return the clamp holder carriage to its initial position in a continuous movement.

According to a preferred embodiment of the invention the nuts mounted on each of the screws are driven back simultaneously by a single yoke mounted on a fork which oscillates under the action of a cam.

As a result of this preferred embodiment it is possible to pass from one clamp holder carriage to the other without in any way changing the speed with which the article to be rolled is introduced into the rollers of the rolling mill. Assuming that the first clamp holder carriage reaches the end of its course and the driving of the stock to be rolled by the second carriage is to be ensured the screw of the second carriage is rotated by the common drive device by actuating the corresponding clutch so that the two screws of the two carriages rotate at the same speed. As the two nuts of the two screws are driven back by the same yoke stop member as from the second movement of the yoke the two screws and therefore the two clamp holder carriages are moved in indentical manner in the rolling direction. After closing the tongs of the tube holder it is then merely necessary to disengage the rotational drive of the first clamp holder carriage from the common drive device and to actuate an auxiliary drive device causing it to rotate in the opposite direction so that the latter, supported on its nut returns the first clamp holder carriage to its initial position in the direction which is opposite to the rolling direction. It is then only necessary to recommence the operation with the second clamp holder carriage. According to a preferred embodiment of the invention the clamp holder carriages are equipped with braking devices comprising jaws which are supported on slides to prevent untimely sliding of the carriages during their working phase. Advantageously these braking devices can be neutralized (e.g. by means of a hydraulic jack) when the clamp holder carriages return to their initial position under the action of the auxiliary motor.

According to a preferred embodiment of the invention the main motor which moves the clamp holder carriages during the forward rolling movement is in the form of a hydraulic motor whilst the return movement of each clamp holder carriage is ensured by a random device, e.g. an electric motor which acts directly on each of the screws and whereof the rotor is driven freely when the screw rotates in the rolling direction.

With the aim of giving a better understanding of the invention in an illustrative and non-limitative manner one embodiment taken as an example and shown in the attached drawings will be described.

FIG. 1 shows schematically in elevation a partial section along the line I—I of FIG. 2 of a drive device according to the invention.

FIG. 2 is a plan view in part section corresponding to FIG. 1

FIG. 3 is a schematic view along the line III—III of FIG. 1 showing the screw control system.

The drawings show schematically the clamp holder carriages 1 and 2, carriage 1 being located on the roller side. The carriages slide on slides 3 conventionally mounted on a frame 4.

Each of the carriages 1 and 2 is equipped with a tube holder 5 which in conventional manner holds a tube 6 which is subjected to rolling action. Obviously, however, the invention is not limited to the rolling of tubes and tube 6 could be replaced by a bar. As the construction and operating of tube holder 5 are conventional they will not be described in greater detail within the scope of the present invention.

Carriage 1 is fixed to a rod 7 by means of a rotary stop 8 in such a way that carriage 1 moves axially with rod 7 which can rotate freely relative to carriage 1. Rod 7 is extended to the left by a screw 9, as can be seen in FIG. 1.

In the same way carriage 2 is fixed to a rod 10 by means of a rotary stop 11, whereby rod 10 is itself extended to the left by a screw 12.

Screws 9 and 12 pass through the casing 13 of the control device. These screws are held by bearings in such a way that they can rotate about their axes and slide axially. They are protected by conventional casings 14. Each of the screws 9 and 12 has a longitudinal groove wherein engages a key 15 fixed to a pinion 16 mounted so as to rotate about casing 13.

Therefore by rotating pinion 16 it is possible to rotate screws 9 and 12 which can simultaneously slide axially relative to the pinions 16.

The two pinions 16 of the two screws 9 and 12 are connected to a hydraulic motor 17 by means of a set of pinions 18, 19 which acts on a pinion 20 engaging with pinion 16 via a clutch 21 which can be controlled mechanically or hydraulically.

FIG. 3 clearly shows how single pinion 18 fixed to motor 17 with the two pinions 19 which via two independent clutches drives pinions 20 and thus pinions 16 which act on each of the screws 9 and 12. It can be seen that each of the pinions 20 meshes with a pinion 22 fixed to the rotor of an electric motor 23.

Under these conditions pinions 16 can be driven either by means of the common hydraulic motor 17 when the corresponding clutch 21 is brought into the drive position (the rotor which is not excited by electric motor 23 then rotates freely) or in the opposite direction when clutch 21 disconnects pinions 19, 20 by means of an electrical motor 23.

Each screw 9 and 12 is also provided with a nut 24 on whose periphery slides a bush carrying a flange which bears against a spring 26 which bears in turn against a flange on the nut 24 whilst key 27 between the bush 25 and nut 24 prevents nut 24 from rotating.

A yoke 28 articulated at 29 on the two arms 30 of a fork which swings about a pivot pin 31 bears against the flanges of bushes 25. The arms 30 of the fork are fixed to a lever 32 whose end has a roll 33 which is supported against an eccentric 34.

It should be borne in mind that, since the nuts 24 are permanently prevented from rotating by the keys 27, clockwise rotation of either of screws 9 and 12 will cause the screw to move to the right when te nut thereon is prevented from moving to the left, and cause the nut to move to the left when the screw which carries it is prevented from moving to the right.

Obviously when yoke 28 moves to the left the bushes 25 also move to the left in response to the force exerted by the springs 26 screws 9 and 12. No axial translational movement of the screws occurs at this time because the said screws are axially integral with clamp holder carriages 1 and 2 which due to their weight and the friction on the slides 3 cannot move easily. This position corresponds to the step in rolling in which the tube being rolled must be kept between the cylinders without forward movement.

It is also obvious that when under the action of cam 34 yoke 28 is driven to the right by the arms 30 of the fork bushes 25 bear against nuts 24, thus moving to the right screws 9 and 12 and therefore also that of clamp holder carriages 1 and 2.

Consequently, if it be assumed that the tube holder of carriage 1 is gripping a tube being worked, and screw 7, connected to carriage 1, is being driven clockwise by the hydraulic motor 17, this screw and carriage will be advanced step-by-step to the right as the yoke 28 moves back and forth.

When carriage 1 is close to its terminal position to the right by operating clutch 21 which corresponds to screw 12 the latter is also rotated by means of hydraulic motor 17. This rotation is absolutely synchronous with that of screw 9.

During its first subsequent stroke to the right yoke 28 drives screw 9 to the right by a length corresponding to the distance to the left covered by nut 24 of screw 9 since operating the clutch. However, during the second stroke yoke 28 simultaneously drives back the two nuts 24 by an equal distance, so that screws 9 and 12 effect identical axial movements.

It is then merely necessary to actuate the tube holder of carriage 2 for the latter to take charge of tube 6. Subsequently the tube holder of carriage 1 is opened screw 9 is disengaged from hydraulic motor 17 by means of a corresponding clutch and with the aid of electric motor 23 corresponding to screw 9 the latter is rotated in the opposite (counter-clockwise) direction.

As nut 24 then abuts stop 28' fixed to casing 13 this rotation brings about the movement to the left of screw 9 and therefore the movement to the left of carriage 1 whilst carriage 2 continues to ensure the movements of tube 6 which are necessary for rolling purposes.

Thus, carriage 1 returns to its initial position with a continuous movement and at the desired speed which is only a function of the rotation speed of electric motor 23. When carriage 2 has reached its terminal position to the right it is merely necessary to perform the same operations for the clamp holder carriage 1 to take charge of tube 6 and transfer thereto its feed movement to the right, whilst carriage 2 is moved to the left to its initial position.

FIGS. 1 and 2 schematically show the braking members 29' of carriages 1 and 2. Members 29' have two jaws 30' which lock slides 3. These jaws are advantageously controlled by springs which are e.g. in the form of Belleville washers.

These braking devices prevent any untimely sliding of the carriages between the times when their movement is controlled by the action of the screws.

The devices 29' are advantageously provided with a hydraulic jack which can neutralize the braking springs at the time where, under the action of electric motors 23, the carriages are returned to their initial positions.

Obviously the present embodiment is not intended to be limitative and all desirable changes can be made thereto without passing beyond the scope of the invention.

What is claimed is:

1. Drive device for clamp holder carriages of a pilger rolling mill, said device comprising slides parallel to the rolling axis of the mill and on which said carriages are slidably mounted, a pair of rotatable screw members mounted for axial movement parallel to said slides, with each screw member having a threaded portion, means for attaching each of said carriages to one of said screw members of axial movement therewith, drive means including clutch means for selectively rotating each of said screw members either clockwise or counterclockwise, an internally threaded nut mounted on each screw member with its threads engaging the threaded portion of said screw members, and means restraining said nuts against rotation on said screw members, means for periodically urging said nuts in one direction axially of said screw members, whereby rotation of either one of said screw members in one angular direction while the nut mounted on said screw member is being urged in said one axial direction will advance the carriage attached to said one screw member in said one axial direction and whereby rotation of either one of said screw members in the opposite angular direction will move the carriage attached to said screw member in the opposite axial direction.

2. Device as claimed in claim 1 in which said means for urging said nuts in said one axial direction comprise a yoke acting on said nuts simultaneously and driven by a cam.

3. Device as claimed in claim 1 in which said clamp holder carriages are provided with braking devices comprising slide-supported jaws which grip said screw members to prevent sliding of a carriage on a screw member while it is being moved by that screw member.

4. Device as claimed in claim 3 comprising means for releasing said braking device when relative movement between a carriage and the associated screw member is desired.

5. Device as claimed in claim 1 in which said drive means comprises a driven gear slidably keyed to each screw member so as to be axially but not rotatably movable relative to said screw.

6. Device as claimed in claim 5 in which said drive means comprises a hydraulic motor connected to drive said screw members in said one angular direction when connected thereto by said clutch means.

7. Device as claimed in claim 6 in which said drive means comprises an electric motor connected to drive either one of said screw members in the other of said angular directions when connected thereto by said clutch.

* * * * *